United States Patent
Booth et al.

(10) Patent No.: US 10,352,299 B2
(45) Date of Patent: Jul. 16, 2019

(54) SYSTEM AND METHOD FOR AUTOMATICALLY UPDATING WIND TURBINE DATA BASED ON COMPONENT SELF-IDENTIFICATION

(71) Applicant: General Electric Company, Schenectady, NY (US)

(72) Inventors: Michael Christopher Booth, Simpsonville, SC (US); Scott Gabell Riddell, Greer, SC (US); Sebastien David Bertrand, Greer, SC (US); James Paul Davidson, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 250 days.

(21) Appl. No.: 15/229,255

(22) Filed: Aug. 5, 2016

(65) Prior Publication Data
US 2018/0038346 A1     Feb. 8, 2018

(51) Int. Cl.
*F03D 17/00*     (2016.01)
*F03D 7/04*     (2006.01)
(Continued)

(52) U.S. Cl.
CPC ............. *F03D 7/042* (2013.01); *F03D 17/00* (2016.05); *F03D 80/50* (2016.05); *G05B 15/02* (2013.01);
(Continued)

(58) Field of Classification Search
CPC .......... F03D 7/042; F03D 17/00; F03D 80/50; F05B 2240/2211; F05B 2270/504; G05B 15/02; Y02E 10/72
See application file for complete search history.

(56) References Cited

U.S. PATENT DOCUMENTS 6,967,577 B2     11/2005     Taylor et al.
7,852,222 B2     12/2010     Johnson et al.
(Continued)

FOREIGN PATENT DOCUMENTS

| CN | 1013006309 A | 11/2008 |
| CN | 101952836 A | 1/2011 |
| EP | 2 216 548 A2 | 8/2010 |

OTHER PUBLICATIONS

Extended European Search Report and Written Opinion issued in connection with corresponding EP Application No. 17181489.0 dated Jan. 5, 2018.

*Primary Examiner* — Abdelmoniem I Elamin
(74) *Attorney, Agent, or Firm* — Dority & Manning, P.A.

(57) ABSTRACT

A method for automatically updating data associated with a wind turbine based on component self-identification may generally include providing instructions for transmitting a polling signal to an identification sensor associated with a wind turbine component and, in response to the transmission of the polling signal, receiving current configuration data for the wind turbine component from the identification sensor. The method may also include comparing the current configuration data received from the identification sensor to last-known configuration data for the wind turbine component and automatically updating one or more parameter settings associated with operating the wind turbine based on any differences identified between the current configuration data and the last-known configuration data.

20 Claims, 4 Drawing Sheets

(51) Int. Cl.
*F03D 80/50* (2016.01)
*F03D 9/00* (2016.01)
*G05B 15/02* (2006.01)

(52) U.S. Cl.
CPC . *F05B 2240/2211* (2013.01); *F05B 2270/504* (2013.01); *Y02E 10/72* (2013.01)

(56) References Cited

U.S. PATENT DOCUMENTS

| | | | |
|---|---|---|---|
| 8,152,053 B2 | 4/2012 | Pietrzyk et al. | |
| 8,454,613 B2 | 6/2013 | Tethrake et al. | |
| 8,509,956 B2* | 8/2013 | Jensen | F03D 7/047 700/286 |
| 9,038,058 B2* | 5/2015 | Molgaard | G06F 9/44505 700/287 |
| 2002/0029097 A1* | 3/2002 | Pionzio, Jr. | F03D 7/047 700/286 |
| 2006/0244652 A1 | 11/2006 | Tethrake et al. | |
| 2007/0055470 A1 | 3/2007 | Pietrzyk et al. | |
| 2007/0159346 A1 | 7/2007 | Wesselink | |
| 2007/0239400 A1 | 10/2007 | Skorpik et al. | |
| 2009/0277266 A1 | 11/2009 | Wang et al. | |
| 2010/0097220 A1 | 4/2010 | Cheng | |
| 2010/0100249 A1* | 4/2010 | Molgaard | G06F 9/44505 700/289 |
| 2010/0173582 A1 | 7/2010 | Han | |
| 2010/0179773 A1* | 7/2010 | Altemark | F03D 17/00 702/34 |
| 2010/0274400 A1* | 10/2010 | Ormel | F03D 7/043 700/287 |
| 2011/0035068 A1* | 2/2011 | Jensen | F03D 7/047 700/287 |
| 2011/0047300 A1 | 2/2011 | Soennichsen et al. | |
| 2011/0140427 A1* | 6/2011 | Srivastava | F03D 7/047 290/44 |
| 2011/0145811 A1* | 6/2011 | Middendorf | F03D 7/047 717/178 |
| 2011/0268569 A1 | 11/2011 | Loh et al. | |
| 2012/0080881 A1* | 4/2012 | Srivastava | F03D 7/042 290/44 |
| 2016/0010628 A1* | 1/2016 | Dhar | F03D 17/00 702/34 |
| 2017/0076235 A1* | 3/2017 | Noto | G06Q 10/06314 |

* cited by examiner

SYSTEM AND METHOD FOR AUTOMATICALLY UPDATING WIND TURBINE DATA BASED ON COMPONENT SELF-IDENTIFICATION

FIELD OF THE INVENTION

The present subject matter relates generally to wind turbines and, more particularly, to a system and method for automatically updating wind turbine data based on component self-identification.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, rotor hub and one or more rotor blades. The rotor blades capture kinetic energy of the wind using known airfoil principles. The rotor blades transmit the kinetic energy in the form of rotational energy to turn a shaft coupling the rotor blades to a gearbox, or if a gearbox is not used, directly to the generator. The generator then converts the mechanical energy to electrical energy that may be deployed to a utility grid.

When operating a wind turbine, it is often desirable to be able to accurately identify the specific components installed within the wind turbine to ensure both that the wind turbine is operated efficiently and effectively and that the various wind turbine components are properly maintained. However, current wind turbine systems do not provide an effective means for tracking the specific components installed within a wind turbine, particularly when one or more of the wind turbine components have been replaced during service/maintenance operations or when upgrading the wind turbine.

Accordingly, an improved system and method for identifying the components installed within a wind turbine and for automatically updating the wind turbine's data based on such component identifications would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for automatically updating data associated with a wind turbine based on component self-identification. The method may include providing instructions for transmitting a polling signal to an identification sensor associated with a wind turbine component and, in response to the transmission of the polling signal, receiving current configuration data for the wind turbine component from the identification sensor. The method may also include comparing the current configuration data received from the identification sensor to last-known configuration data for the wind turbine component and automatically updating one or more parameter settings associated with operating the wind turbine based on any differences identified between the current configuration data and the last-known configuration data.

In another aspect, the present subject matter is directed to a method for automatically updating data associated with a wind turbine based on component self-identification. The method may include providing instructions for transmitting a polling signal to an identification sensor associated with a wind turbine component and, in response to the transmission of the polling signal, receiving configuration data for the wind turbine component from the identification sensor. The method may also include comparing the current configuration data received from the identification sensor to last-known configuration data for the wind turbine component, determining that the wind turbine component has been replaced based on any differences identified between the current configuration data and the last-known configuration data and automatically updating, by the one or more computing devices, wind turbine data associated with the wind turbine based on the determination that the wind turbine component has been replaced.

In a further aspect, the present subject matter is directed to a system for automatically updating data associated with a wind turbine based on component self-identification. The system may generally include a wind turbine component installed on or within the wind turbine and an identification sensor provided in association with the wind turbine component, wherein the identification sensor includes current configuration data for the wind turbine component. The system may also include one or more computing devices have at least one processor and associated memory. The memory may store instructions that, when implemented by the processor(s), configure the computing device(s) to, provide instructions for transmitting a polling signal to an identification sensor associated with a wind turbine component and, in response to the transmission of the polling signal, receive current configuration data for the wind turbine component from the identification sensor. The computing device(s) may also be configured to compare the current configuration data received from the identification sensor to last-known configuration data for the wind turbine component and automatically update one or more parameter settings associated with operating the wind turbine based on any differences identified between the current configuration data and the last-known configuration data.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for automatically updating wind turbine data based on component self-identification. Specifically, in several embodiments, the disclosed system may include a plurality of identification sensors configured to communicate (e.g., via a wireless or wire connection) with one or more sensor readers installed on or within the wind turbine, with each identification sensor being provided in association with a different component of the wind turbine. Each identification sensor may include or contain configuration data related to its corresponding wind turbine component, such as the name of the component manufacturer, the component's serial number and/or model number, and/or the date/location of manufacture. Additionally, the sensor reader(s) may form part of or may otherwise be communicatively coupled to the turbine controller for the wind turbine. As such, the turbine controller may utilize the sensor reader(s) to ping or poll the identification sensors so that each identification sensor transmits the configuration data associated with its corresponding component back to the controller. The turbine controller may then utilize the received configuration data to determine whether any of the wind turbine components have been recently replaced (e.g., based on a comparison between newly received data and previously stored configuration data for the wind turbine components). In the event that it is determined that one or more of the wind turbine components have been replaced, the turbine controller may be configured to automatically update one or more data sets associated with the wind turbine, such as by updating one or more parameter settings associated with operating the wind turbine and/or by updating an estimated component life and/or a maintenance schedule associated with one or more of the wind turbine components.

Figure 1:
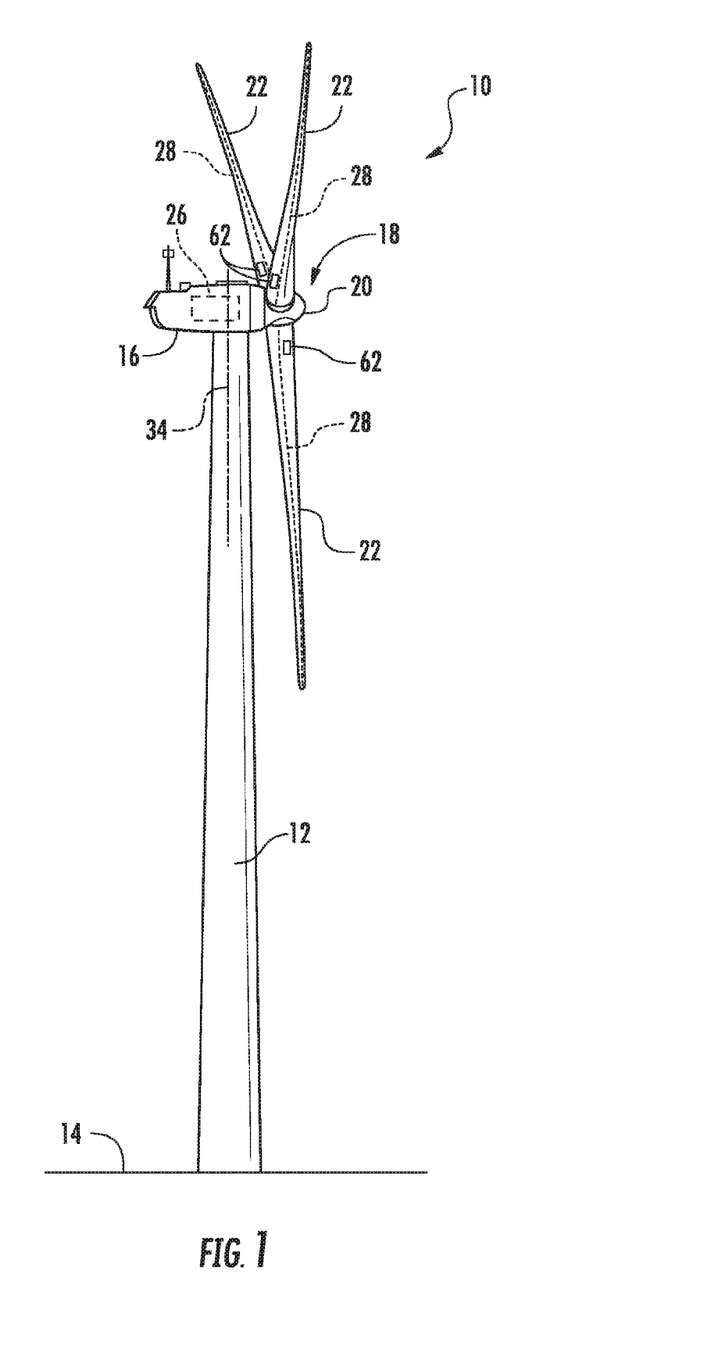
FIG. 1 illustrates a perspective view of one embodiment of a wind turbine.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16. In general, the turbine controller 26 may comprise a computing device and/or any other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the turbine controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. Specifically, in several embodiments, the turbine controller 26 may control the pitch angle of the rotor blades 22, either individually or simultaneously, by transmitting suitable control signals directly or indirectly (e.g., via a pitch controller 30 (FIG. 2)) to one or more pitch adjustment mechanisms 32 (FIG. 2) of the wind turbine 10. Similarly, the controller 26 may be configured to adjust the yaw angle of the nacelle 16 (i.e., an angle that determines a perspective of the nacelle 16 relative to the direction of the wind) about a yaw axis 34 of the wind turbine 10. For example, the controller 26 may transmit suitable control signals to one or more yaw drive mechanisms 36 (FIG. 2) of the wind turbine 10 to automatically control the yaw angle.

Additionally, in accordance with aspects of the present subject matter, the turbine controller 26 may also be configured to automatically adjust one or more data sets associated with the wind turbine 10. Specifically, as will be described below, the turbine controller 26 may be configured to identify when an existing component of the wind turbine 10 has been replaced (e.g., with a new component that has a differing configuration than the previously installed component). In such instance, the turbine controller 26 may, in one embodiment, automatically adjust one or more related parameter settings for the wind turbine 10 to account for the differing configuration of the replacement component.

Figure 2:
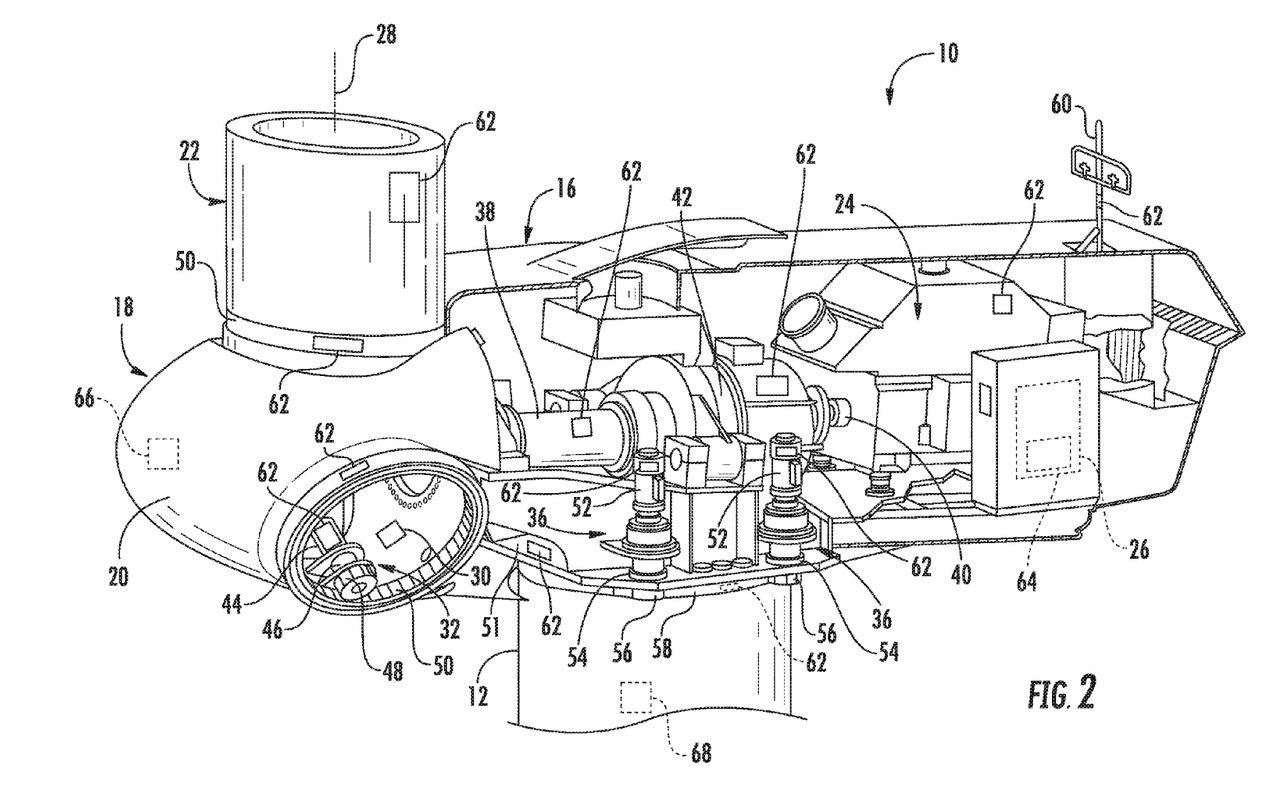
FIG. 2 illustrates a perspective, internal view of one embodiment of a nacelle suitable for use with the wind turbine shown in FIG. 1, particularly illustrating a plurality of identification sensors provided in association with various components of the wind turbine in accordance with aspects of the present subject matter.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 38 coupled to the hub 20 for rotation therewith. The rotor shaft 38 may, in turn, be rotatably coupled to a generator shaft 40 of the generator 24 through a gearbox 42. As is generally understood, the rotor shaft 38 may provide a low speed, high torque input to the gearbox 42 in response to rotation of the rotor blades 22 and the hub 20. The gearbox 42 may then be configured to convert the low speed, high torque input to a high speed, low torque output to drive the generator shaft 40 and, thus, the generator 24.

Additionally, as indicated above, the turbine controller 26 may also be located within the nacelle 16 (e.g., within a control box or panel). However, in other embodiments, the turbine controller 26 may be located within any other component of the wind turbine 10 or at a location outside the wind turbine (e.g., when the controller 26 is configured as a farm controller for controlling a plurality of wind turbines). As is generally understood, the turbine controller 26 may be communicatively coupled to any number of the components of the wind turbine 10 in order to control the operation of such components. For example, as indicated above, the turbine controller 26 may be communicatively coupled to each pitch adjustment mechanism 32 of the wind turbine 10 (one for each rotor blade 22) via a pitch controller 30 to facilitate rotation of each rotor blade 22 about its pitch axis 28.

In general, each pitch adjustment mechanism 32 may include any suitable components and may have any suitable configuration that allows the pitch adjustment mechanism 32 to function as described herein. For example, in several embodiments, each pitch adjustment mechanism 32 may include a pitch drive motor 44 (e.g., any suitable electric motor), a pitch drive gearbox 46, and a pitch drive pinion 48. In such embodiments, the pitch drive motor 44 may be coupled to the pitch drive gearbox 46 so that the pitch drive motor 44 imparts mechanical force to the pitch drive gearbox 46. Similarly, the pitch drive gearbox 46 may be coupled to the pitch drive pinion 48 for rotation therewith. The pitch drive pinion 48 may, in turn, be in rotational engagement with a pitch bearing 50 coupled between the hub 20 and a corresponding rotor blade 22 such that rotation of the pitch drive pinion 48 causes rotation of the pitch bearing 50. Thus, in such embodiments, rotation of the pitch drive motor 44 drives the pitch drive gearbox 46 and the pitch drive pinion 48, thereby rotating the pitch bearing 50 and the rotor blade 22 about the pitch axis 28.

In alternative embodiments, it should be appreciated that each pitch adjustment mechanism 32 may have any other suitable configuration that facilitates rotation of a rotor blade 22 about its pitch axis 28. For instance, pitch adjustment mechanisms 32 are known that include a hydraulic or pneumatic driven device (e.g., a hydraulic or pneumatic cylinder) configured to transmit rotational energy to the pitch bearing 50, thereby causing the rotor blade 22 to rotate about its pitch axis 28. Thus, in several embodiments, instead of the electric pitch drive motor 44 described above, each pitch adjustment mechanism 32 may include a hydraulic or pneumatic driven device that utilizes fluid pressure to apply torque to the pitch bearing 50.

Moreover, as indicated above, the wind turbine 10 may also include one or more yaw drive mechanisms 36 mounted to and/or through a bedplate 51 positioned atop the wind turbine tower 12. Specifically, each yaw drive mechanism 36 may be mounted to and/or through the bedplate 51 so as to engage a yaw bearing 58 coupled between the bedplate 51 and the tower 12. The yaw bearing 58 may be mounted to the bed plate 51 such that, as the yaw bearing 58 rotates about the yaw axis 34 (FIG. 1) of the wind turbine 10, the bedplate 51 and, thus, the nacelle 16 are similarly rotated about the yaw axis 34.

In general, it should be appreciated that the yaw drive mechanisms 36 may have any suitable configuration and may include any suitable components known in the art that allow such mechanisms 36 to function as described herein. For example, as shown in FIG. 2, each yaw drive mechanism 36 may include a yaw drive motor 52 (e.g., any suitable electric motor), a yaw drive gearbox 54, and a yaw drive pinion 56 coupled together for simultaneous rotation. However, in other embodiments, each yaw drive mechanism 36 may have any other suitable configuration, such as by being hydraulic or pneumatic driven. Regardless, the yaw drive mechanism(s) 36 may be configured to adjust the yaw angle by rotationally engaging the yaw drive pinion 56 with the yaw bearing 58 (also referred to as a slewring or tower ring gear), thereby allowing the nacelle 16 to be rotated about the yaw axis 34 (FIG. 1) relative to the wind.

It should be appreciated that, by controlling the various components of the wind turbine 10, the turbine controller 26 may be configured to automatically adjust the operation of the wind turbine 10. For example, as indicated above, the turbine controller 26 may be configured to transmit suitable control signals to the pitch adjustment mechanisms 32 (via the pitch controller 30) to automatically adjust the pitch angle of the rotor blades 22. Similarly, the turbine controller 26 may be configured to transmit suitable control signals to the yaw drive mechanism(s) 36 to allow for the yaw angle of the nacelle 16 to be automatically adjusted. In addition, the turbine controller 26 may be communicatively coupled to various other wind turbine components in order to control different aspects of the wind turbine operation. For example, the turbine controller 26 may be communicatively coupled to the generator 24 to allow for the automatic adjustment of the generator torque, generator speed and/or any other suitable operational aspects of the generator 24.

In addition, the wind turbine 10 may also include one or more sensors for monitoring various operating parameters of the wind turbine 10. For example, in several embodiments, the wind turbine 10 may include one or more wind sensors 60 (e.g., one or more anemometers) for monitoring the wind speed at or adjacent to the wind turbine 10. As shown in FIG. 2, the wind turbine 10 includes a wind sensor(s) 60 mounted on top of the nacelle 16. However, in alternative embodiments, the wind sensor(s) 60 may be configured to be located at any other suitable location on and/or adjacent to the wind turbine 10 that allows for the measurement of the wind speed. Moreover, the wind turbine 10 may include various other sensors for monitoring any other suitable operating parameters of the wind turbine 10, such as one or more blade sensors, shaft sensors, generator sensors, tower sensors, hub sensors, temperature sensors, humidity sensors and/or the like.

Referring still to FIG. 2, the wind turbine 10 may also include a plurality of identification sensors 62 provided in association with all or a portion of the various wind turbine components. Specifically, in several embodiments, a separate identification sensor 62 may be mounted on, installed within or otherwise associated with each wind turbine component for which it is desirable for the turbine controller 26 to be able to verify the identification and/or current configuration of such component. For instance, as shown in FIG. 2, an identification sensor(s) may be may be mounted on, installed within or otherwise associated with the generator 24, the gearbox 42, one or more of the pitch bearings 50, the yaw bearing 58, one or more of the rotor blades 22 (see also FIG. 1), the bedplate 51, one or more components of the pitch drive system (e.g., one or more components of the pitch adjustment mechanism(s) 32), one or more components of the yaw drive system (e.g., one or more components of the yaw adjustment mechanism(s) 36), the rotor shaft 38 and/or one or more of the wind turbine sensors (e.g., wind sensor(s) 60). However, in other embodiments, an identification sensor(s) 62 may be mounted on, installed within or otherwise associated with any other suitable component(s) and/or any combination of components of the wind turbine 10. For instance, one or more identification sensor(s) 62 may be provided in associated with one or more of the downtower components of the wind turbine 10, such as any of the associated power generation equipment (e.g., power converters, control cabinets, etc.).

In several embodiments, each identification sensor 62 may include or otherwise contain data associated with the configuration of its corresponding component. For instance, the identification sensor 62 provided in association with the gearbox 42 may include configuration data for the gearbox 42 while the identification sensor 62 provided in association with a given rotor blade 22 may include configuration data for such blade 22. Similarly, the identification sensor 62 provided in association with the generator 24 may include configuration data for the generator 24 while the identification sensor 62 provided in association with the wind sensor(s) 60 may include configuration data for such sensor(s) 60.

In general, the configuration data included within each identification sensor 62 may correspond to information/data related to the identification and/or configuration of the associated component. For instance, configuration data may include, but is not limited to, a generic name for the component, the name of the component manufacturer, the model number for the component, the serial number for the component, the component's date of manufacture and/or the component's location of manufacture. Moreover, configuration data may also include information related to one or more specific parameters and/or operating capacities associated with a given component. For instance, in addition to the model/serial number and/or the manufacturing information (e.g., the manufacturer's name and/or the date/location of manufacture), the identification sensor 62 provided in association with the gearbox 42 may include configuration data related to its gearbox ratio while the identification sensor 62 provided in association with each rotor blade 22 may include configuration data related to one or more of its blade-specific parameters (e.g., an optimal tip-speed ratio or a minimum or desired pitch angle).

In several embodiments, each identification sensor 62 may be configured to communicate with the turbine controller 26 via one or more sensor readers 64, 66, 68 installed within and/or relative to the wind turbine 10. For example, as shown in FIG. 2, a first sensor reader 64 may be positioned within the nacelle 16 (e.g., by being positioned adjacent to or integrated within the controller 26) to allow the sensor reader 64 to communicate via a wireless or wired connection with the identification sensors 62 associated with the components installed within or adjacent to the nacelle 16 (e.g., the gearbox 42, generator 24, wind sensor(s) 60, yaw drive mechanism(s) 36, yaw bearing 58, bedplate 51, rotor shaft 38, etc.) while a second sensor reader 66 may be positioned within the hub 20 to allow the sensor reader 66 to communicate via a wireless or wired connection with the identification sensors 62 (associated with the components installed within and/or adjacent to the hub 22 (e.g., the pitch drive mechanism(s) 62, rotor blades 22, pitch bearings 50, etc.). Similarly, a third sensor reader 68 may be positioned within the tower 12 to allow the sensor reader 68 to communicate via a wireless or wired connection with the identification sensors 62 associated with the components installed within and/or adjacent to the tower 12 (e.g., any downtower components). However, in other embodiments, the wind turbine 10 may simply include a single sensor reader positioned at a single location on or within the wind turbine 10 or the wind turbine 10 may include four or more sensor readers positioned at numerous locations on or within the wind turbine 10. In such embodiments, when the identification sensors 62 are configured to communicate wirelessly with the sensor reader(s), the specific number and/or location of the sensor reader(s) may generally depend on the wireless communications range(s) for the identification sensors 62 and the associated sensor reader(s).

It should be appreciated that the identification sensors 62 and associated sensor readers 64, 66, 68 may generally have any suitable configuration that allows such components to communicate with one another, thereby allowing the configuration data provided in each identification sensor 62 to be transmitted to the sensor readers 64, 66, 68 upon request by the turbine controller 26. For instance, in several embodiments, each identification sensor 62 and each sensor reader 64, 66, 68 may include or be associated with a wireless antenna, such as a two-way transmitter-receiver, to allow the components to transmit and receive wireless communications. In such embodiments, each sensor reader 64, 66, 68 may be configured to ping or poll the identification sensor(s) 62 located within its wireless communication range. For instance, upon request from the turbine controller 26, each sensor reader 64, 66, 68 may transmit an interrogation or polling signal requesting that each identification sensor(s) 62 within its wireless communication range transmit back the configuration data associated with such sensor(s) 62. In response to receiving the polling signal, each identification sensor 62 may then wirelessly transmit its configuration data to the associated sensor reader 64, 66, 68, which may, in turn, transmit the data to the turbine controller 26.

In a particular embodiment, each identification sensor 62 may correspond to a radio-frequency identification (RFID) tag. In such an embodiment, each sensor reader 64, 66, 68 may similarly correspond to an RFID reader configured to wireless communicate with the various RFID tags. For instance, each sensor reader 64, 66, 68 may be configured to transmit electromagnetic interrogation or polling signals to the various identification sensors 62 and subsequently receive and read the response from each sensor 62. It should be appreciated that, when utilizing RFID technology, each identification sensor 62 may correspond to either a passive RFID tag (e.g., by being powered by the radio energy transmitted from the reader) or an active RFID tag (e.g., by including an associated battery or power source). It should also be appreciated that, in other embodiments, the identification sensors 62 and associated sensor readers 64, 66, 68 may be configured to communicate with one another using any other suitable wireless communications technology and/or any other suitable wireless communications protocol, such as Bluetooth.

As indicated above, each sensor reader 64, 66, 68 may be communicatively coupled to the turbine controller 26 (e.g., via a wired or wireless connection) to allow the configuration data received from the identification sensors 62 to be transmitted to the controller 26 for subsequent processing. In addition, the connection between the turbine controller 26 and the sensor reader 64, 66, 68 may allow the controller 26 to transmit suitable control signals to each sensor reader 64, 66, 68 for controlling its operation. For example, the turbine controller 26 may send a control signal(s) to each sensor reader 64, 66, 68 (e.g., on a daily, weekly, or monthly basis) instructing the readers 64, 66, 68 to interrogate or poll the various identification sensors 62 associated with the wind turbine components currently installed within the wind turbine 10 and to report back configuration data received from the sensors 62. As a result, using the sensor readers 64, 66, 68 and associated identification sensors 62, the turbine controller 26 may periodically poll the wind turbine 10 to identify the current configuration of the specific component(s) installed therein at a given point in time, thereby allowing the controller 26 to determine whether any of such components have been replaced since the last time the wind turbine 10 was polled.

In addition, when it is determined that a given component has been replaced, the turbine controller 26 may also identify whether the replacement component has the same or a different configuration than the previously installed component. In the event that the replacement component does in fact have a different configuration, the turbine controller 26 may then determine whether any parameter settings associated with controlling the operation of the wind turbine 10 need to be updated to account for the identified difference(s) in the component configuration(s). For instance, if the turbine controller 26 determines that the gearbox 42 has been recently replaced and the replacement gearbox has a gear ratio that differs from the gear ratio of the previous gearbox, the controller 26 may be configured to automatically adjust any parameter settings that vary based on the gear ratio of the gearbox 26 to ensure efficient and safe operation of the wind turbine 10.

Figure 3:
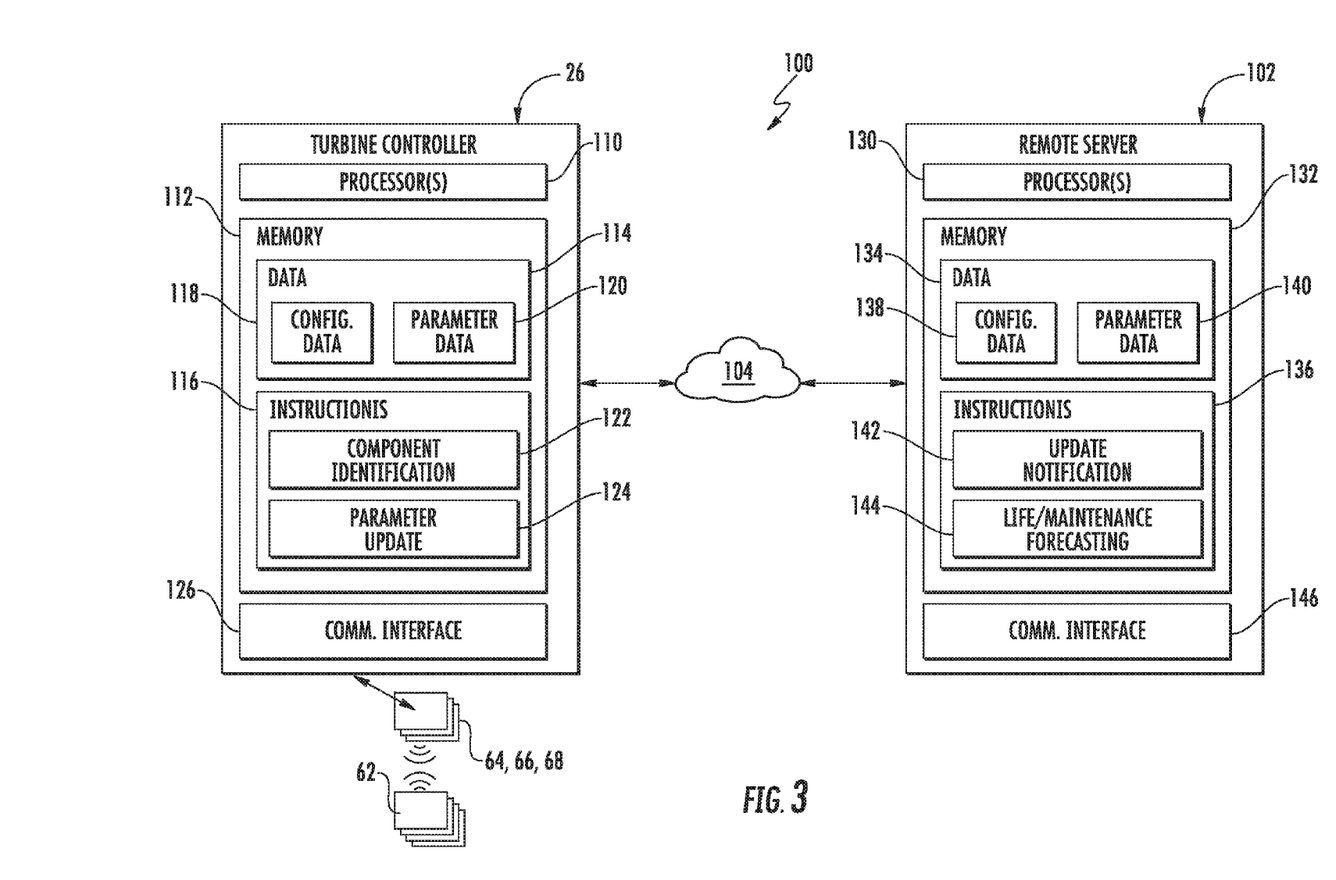
FIG. 3 illustrates a schematic view of one embodiment of a system for automatically updating wind turbine data based on component self-identification in accordance with aspects of the present subject matter.

Referring now to FIG. 3, one embodiment of a system 100 for automatically updating wind turbine data based on component self-identification is illustrated in accordance with aspects of the present subject matter. In general, the system 100 will be described herein with reference to the wind turbine 10 and associated turbine controller 26 described above with reference to FIGS. 1 and 2. However, in other embodiments, the system 100 may be implemented or used in association with any other suitable wind turbine and/or any other suitable controller or other suitable computer/computer network.

As shown in FIG. 3, in one embodiment, the system 100 may include a client-server architecture, with the turbine controller 26 being configured to communicate with a remote computing device or server 102 over a network 104. As indicated above, the turbine controller 26 may generally correspond to any suitable computing device and/or any suitable combination of computing devices. Similarly, the remote server 102 may correspond to any suitable computing device and/or any suitable combination of computing devices. It should be appreciated that, although the remote server 102 is shown in FIG. 3 as being provided in communication with a single turbine controller 26, the server 102 may generally be configured to communicate with any number of turbine controllers associated with any corresponding number of wind turbines. For instance, the remote server 102 may be configured to communicate with a plurality of turbine controllers associated with wind turbines located within a given wind farm or with wind turbines spread out across multiple wind farms provided at various different locations.

As indicated above, the turbine controller 26 may be communicatively coupled (e.g., via a wired or wireless connection) to one or more sensor readers 64, 66, 68 for communicating with the various identification sensors 62 provided in association with the wind turbine components, thereby allowing the controller 26 to receive the current configuration data for the components installed within the wind turbine 10. In one embodiment, the sensor reader(s) 64, 66, 68 may correspond to separate components configured to be separately coupled to the controller 26. Alternatively, the sensor reader(s) 64, 66, 68 may be integrated into or otherwise form part of the turbine controller 26 itself. For instance, the turbine controller 26 may include one or more wireless antennas configured to function as the disclosed sensor reader(s) 64, 66, 68. In such an embodiment, the sensor reader(s) 64, 66, 68 may be communicatively coupled to the turbine controller 26 by providing a communicative link between the wireless antenna(s) and one or more other components of the controller 26, such as the processor(s) and/or memory described below.

As shown in FIG. 3, the turbine controller 26 may generally include one or more processor(s) 110 and associated memory 112 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110. It should be appreciated that, although the processor(s) 110 and memory 112 for the turbine controller 26 are shown in FIG. 3 as being disposed at a common location, the processor(s) 110 and memory 112 may, instead, be disposed at separate locations. For instance, the processor(s) 110 may correspond to a network-connected processor (e.g., a cloud-connected processor) that is able to retrieve data and other information from a remote memory device(s) over the network 104.

In several embodiments, the data 114 may be stored in one or more databases. For example, the memory 112 may include a configuration database 118 storing configuration data related to the various components of the wind turbine 10. Specifically, in one embodiment, when the wind turbine 10 is initially installed in the field, the initial configuration data for all of the wind turbine components may be stored within the configuration database 118. Thereafter, the configuration data stored within the database 118 may be updated, as necessary or desired, to account for changes in the configuration data of one or more of the wind turbine components. For instance, when it is determined that the configuration data for a specific wind turbine component has changed based on the information received from its associated identification sensor 62 (e.g., via the sensor reader(s) 64, 66, 68), the configuration data for such component may be updated within the database 118 to reflect the change in the data.

The memory 112 may also include a parameter database 120 for storing parameter settings associated with operating the wind turbine 10. In general, the parameter settings may correspond to any suitable conditions, constraints, operating values, operating variables, ranges, and/or other parameters that may be used or applied when operating a wind turbine 10. For example, suitable parameter settings may include, but are not limited to, gearbox ratios, minimum and maximum component temperatures, specific blade settings (e.g., desired pitch angle, minimum pitch angle and/or optimal tip-speed ratio), parameter settings dependent on generator type (e.g., 50 Hz or 60 Hz), generator fan settings, wind sensor parameter settings (e.g., multipliers, dividers and/or offsets to be applied to sensor measurements), ride-through settings (e.g., parameters associated with low voltage ride-through events and/or zero voltage ride-through events), torque settings (e.g., correction factors for blade torque characteristics), pitch drive system settings (e.g., pitch brake periods, pitching schedules), battery settings (e.g., battery charging periods), yaw drive system settings (e.g., yaw timers), alarm settings, and/or the like.

In several embodiments, one or more of the parameters applied or used when operating the wind turbine 10 may vary as a function of the specific configuration of one or more of the components installed within the wind turbine 10. In such embodiments, each configuration-dependent parameter may, for example, include multiple parameter settings stored within the database 120, with each parameter setting being associated with a different component configuration(s). For instance, a look-up table(s) may be stored within the database 120 for each configuration-dependent parameter that correlates different parameter settings for such parameter to different component configurations, such as by storing a look-up table that correlates a given blade parameter (e.g., tip-speed ratio values or pitch angle settings) to differing blade configurations or by storing a look-up table that correlates wind sensor offset values to differing wind sensors.

Additionally, in several embodiments, the instructions 116 stored within the memory 112 of the turbine controller 26 may be executed by the processor(s) 110 to implement a component identification module 122. In general, the component identification module 122 may be configured to obtain the current configuration data for the various components installed within the wind turbine 10 and compare such data to the last-known or existing configuration data stored within the configuration database 118. Specifically, in several embodiments, the component identification module 122 may be configured to cause an interrogation or polling signal to be transmitted to the various identification sensors 62 (e.g., by controlling the operation of the sensor reader(s) 64, 66, 68) requesting that each sensor 62 respond by transmitting its associated configuration data. Upon receipt of the configuration data from the identification sensors 62, the component identification module 122 may be configured to compare the newly received data to the configuration data previously stored within the configuration database 118. Based on the comparison, the component identification module 122 may identify differences between the newly received and previously stored configuration data for a given component, thereby allowing the turbine controller 26 to determine when a component has been replaced since the last time the identification sensors 62 were polled. In the event that one of the components has been recently replaced, the component identification module 122 may cause the configuration data for such component to be updated within the database 118. In addition, the component identification module 122 may also be configured transmit a notification to the remote server 102 that identifies both the component that was replaced and its new configuration data.

It should also be appreciated that the component identification module 122 may be configured to identify when data is not received back from one or more of the identification sensors 62 in response to the polling signal, which may indicate that such identification sensor(s) is not functioning properly or that the associated wind turbine component has been replaced with a component that does not include an identification sensor 62. For instance, assuming that a previous response has been received from the identification sensor 62 associated with the gearbox 42, it may be inferred that the gearbox identification sensor 62 is not functioning or that the gearbox 42 has been replaced with a new sensorless gearbox in the event that the component identification module 122 does not receive data from the gearbox identification sensor 62 in response to a subsequent polling signal. In such event, a notification or alert may be produced indicating that a further investigation should be conducted with reference to the gearbox 42 and its sensor 62.

Moreover, the instructions 116 stored within the memory 112 of the turbine controller 26 may also be executed by the processor(s) 110 to implement a parameter update module 124. In general, the parameter update module 124 may be configured to automatically update one or more of the parameter settings applied or used when operating the wind turbine 10 based on identified changes in the configuration data of one or more of the wind turbine components. For example, when the component identification module 122 determines that one or more differences exist between the newly received and previously stored configuration data for a given component, the parameter update module 124 may be configured to determine whether any of the identified differences require any adjustments to be made to the current parameter settings for the wind turbine 10. Specifically, in one embodiment, it may be determined that is necessary or desired to adjust one or more of the current parameter settings when the identified differences in the configuration data relate to a configuration-dependent parameter of the wind turbine 10. In such instance, the parameter update module 124 may be configured to automatically update the associated parameter setting(s) for the wind turbine 10 by adjusting the current parameter setting(s) to a new parameter setting(s) in order to accommodate the changes in the component configuration(s).

As shown in FIG. 3, the turbine controller 26 may also include a network or communications interface 126 to provide a means for the controller 26 to communicate with the remote server 102 or any other suitable computing device(s) over the network 104. In general, the communications interface 126 may correspond to any suitable device/medium that allows the controller 26 to interface with the server 102 and/or any other suitable network. In addition, the communications interface 126 may also provide a means for the turbine controller 26 to communicate directly or indirectly with one or more local devices, such as the sensor readers 64, 66, 68 and/or the identification sensors 62.

Additionally, similar to the turbine controller 26, the remote server 102 may also include one or more processor(s) 130 and associated memory 132 configured to perform a variety of computer-implemented functions (e.g., performing the methods, steps, calculations and the like disclosed herein). Such memory 132 may generally be configured to store information accessible to the processor(s) 130, including data 134 that can be retrieved, manipulated, created and/or stored by the processor(s) 130 and instructions 136 that can be executed by the processor(s) 130.

In several embodiments, the data 134 may be stored in one or more databases. For instance, as shown in FIG. 1, the memory 132 may include a configuration database 138 storing configuration data received from the turbine controller 26. For example, each time the turbine controller 26 polls the identification sensors 62 and subsequently receives the corresponding component configuration data, the controller 26 may, in one embodiment, automatically transmit the configuration data to the remote server 102 for storage within the configuration database 138. Alternatively, the turbine controller 26 may only transmit configuration data to the remote server 102 that has been recently changed or updated. For instance, if the component identification module 122 identifies differences in a component's configuration data, the turbine controller 26 may transmit the dataset including the identified difference(s) to the remote server 102 for storage within the configuration database 138.

In addition, the memory 132 may also include a parameter database 140 for storing parameter settings associated with operating the wind turbine 10. For instance, the parameter settings stored within the parameter database 138 of the remote server 102 may, in one embodiment, corresponds to the same parameter settings stored within the parameter database 120 of the turbine controller 26. In such an embodiment, each time the parameter update module 124 of the turbine controller 26 updates one or more of the wind turbine's parameter settings, a notification may be transmitted to the remote server 102 indicating the changes made to the parameter setting(s). The updated parameter settings may then be stored within the parameter database 140 to allow an accurate listing of the current parameter settings for the wind turbine 10 to be maintained at the remote server 102.

Moreover, in several embodiments, the instructions 136 stored within the memory 132 of the remote server 102 may be executed by the processor(s) 130 to implement an update notification module 142. In general, the update notification module 142 may be configured to receive notifications from the turbine controller 26 related to changes in the configuration data for one or more of the wind turbine components and/or updates made to one or more of the parameter settings for the wind turbine 10. In addition, the update notification module 142 may be configured to transmit notifications to the turbine controller 26 related to the current parameter settings for the wind turbine 10 and/or the current configuration of its components. For instance, the update notification module 142 may be configured to transmit a notification to the turbine controller 26 including suggested parameter settings for the wind turbine 10 based on data received from the controller 26 related to any identified changes in the configuration data for one or more of the wind turbine components. As such, in the event that a replacement component is installed within the wind turbine 10 for which the turbine controller 26 does not have suitable parameter settings to account for the new configuration of such component, the update notification module 142 may transmit the corresponding parameter settings to the turbine controller 26 to allow the controller 26 to update the parameter settings accordingly.

Referring still to FIG. 3, the instructions 136 stored within the memory 132 of the remote server 102 may also be executed by the processor(s) 130 to implement a life/maintenance forecasting module 144. In general, the forecasting module 144 may be configured to estimate a remaining component life for each wind turbine component and/or schedule appropriate maintenance intervals for each wind turbine component. For instance, the forecasting module 144 may be provided access to operating data for the wind turbine 10 (e.g., time binned data of relevant operating parameters, such as output power and wind speed) as well as data related to any fault messages issued by the turbine controller 26. By analyzing such data, the forecasting module 144 may estimate the remaining component life for each wind turbine component, which may be used to determine when to order and/or install replacement parts. In such an embodiment, the remote serve 102 may be configured to automatically order replacement parts and/or schedule the replacement of components nearing the end of their component life or the remote serve 102 may simply transmit a notification to the turbine controller 102 identifying the component(s) that need to be replaced. In addition, the analysis of the data received for the wind turbine 10 may also allow the forecasting module 144 to more accurately schedule services intervals for performing routine maintenance on the wind turbine 10.

Moreover, the forecasting module 144 may also be configured to adjust the estimated component life and/or the maintenance schedule(s) associated with a given component based on the configuration data received from the turbine controller 26. For instance, when the remote server 102 receives new configuration data indicating that a given wind turbine component has been recently replaced, the forecasting module 144 may be configured to identify such component as being a newly installed component and, thus, may update the estimated component life and/or the maintenance schedule for the component accordingly.

As shown in FIG. 3, the remote server 102 may also include a network or communications interface 146 for communicating with the turbine controller 26 or any other suitable computing device(s) over the network 104 (and/or any other suitable network). Similar to the interface 126 provided for the turbine controller 26, the communications interface 146 may generally be any device/medium that allows the remote server to interface with the network 104.

It should be appreciated that the network 104 may correspond to any suitable wired or wireless network(s) that allows the various system components to communicate with one another via any suitable communications protocol (e.g. TCP/IP, HTTP, SMTP, FTP) and/or using any suitable encodings/formats (e.g. HTML, JSON XML) and/or protection schemes (e.g. VPN, secure HTTP, SSL). For example, in one embodiment, the network 104 may correspond to a wide-area network (WAN).

Additionally, it should be appreciated that, although various functions and/or processes are generally described above as being performed by a given system component (e.g., the turbine controller 26 and/or the remote server 102), such functions and/or processes may, instead, be performed by a different system component. For example, as opposed to the remote server 102, the turbine controller 26 may be configured to implement the various functions of the forecasting module 144. Similarly, in one embodiment, the remote server 102 may be configured to implement the various function of the parameter update module 124.

Figure 4:
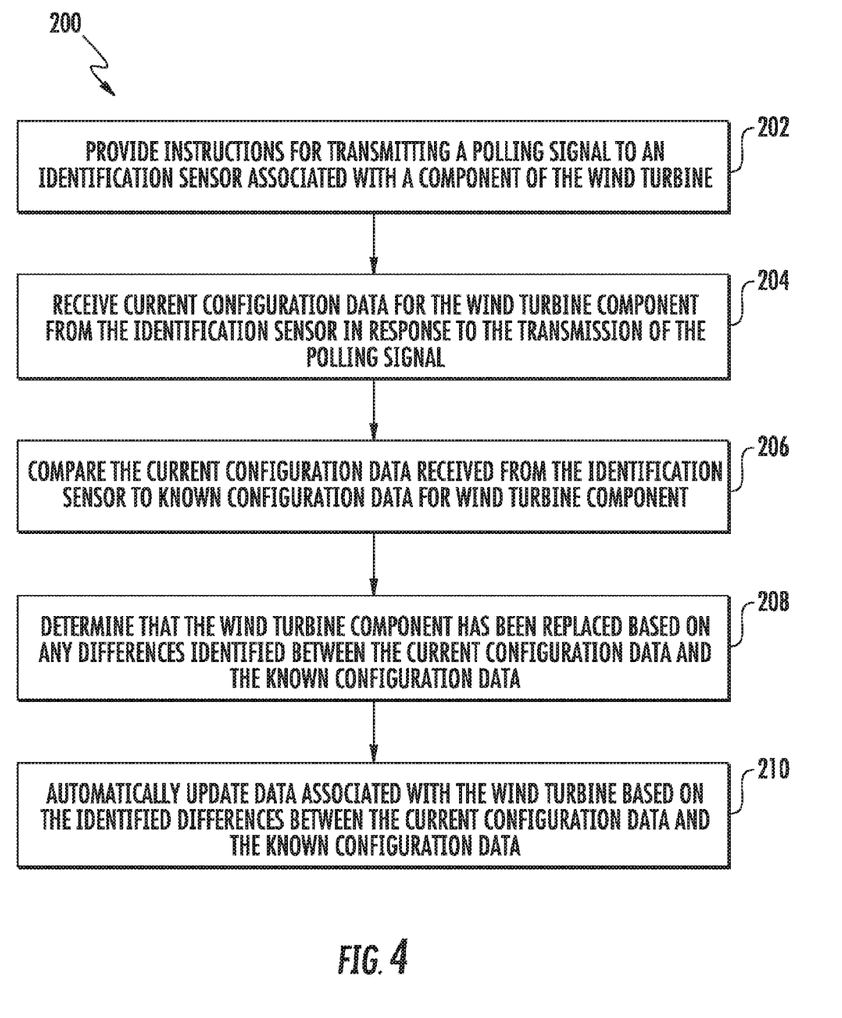
FIG. 4 illustrates a flow diagram of one embodiment of a method for automatically updating wind turbine data based on component self-identification in accordance with aspects of the present subject matter.

Referring now to FIG. 4, a flow diagram of one embodiment of a method for automatically updating wind turbine data based on component self-identification is illustrated in accordance with aspects of the present subject matter. In general, the method 200 will be described herein with reference to the system 100 described above with reference to FIG. 3. However, it should be appreciated that the disclosed method 200 may also be utilized with any other suitable system to allow for the automatic adjustment of wind turbine data. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include providing instructions for transmitting a polling signal to an identification sensor associated with a component of the wind turbine. Specifically, as indicated above, turbine controller 26 may be configured to control the operation of the sensor readers 64, 66, 68 such that each sensor reader 64, 66, 68 transmits an interrogation or polling signal to the various identification sensors 62 provided in association with the wind turbine components.

Additionally, at (204), the method 200 may include receiving current configuration data for the wind turbine component from the identification sensor in response to the transmission of the polling signal. For instance, as indicated above, each identification sensors 62 may be configured to transmit its associated configuration data back to one or more of the sensor readers 64, 66, 68 in response to receiving the polling signal. The configuration data may then be transmitted to the turbine controller 26 for storage thereon and/or for subsequent processing.

Moreover, at (206), the method 200 may include comparing the current configuration data received from the identification sensor to known configuration data for wind turbine component. For instance, as indicated above, the turbine controller 26 may include a configuration database 118 for storing last-known configuration data associated with the various components installed within the wind turbine 10. In addition, the turbine controller 26 may be configured to implement a component identification module 122 that is configured to compare the current configuration data received from the identification sensors 62 to the last-known configuration data previously stored within the database 118.

Referring still to FIG. 4, at (208), the method 200 may include determining that the wind turbine component has been replaced based on any differences identified between the current configuration data and the known configuration data. Specifically, as indicated above, the component identification module 122 of the turbine controller 26 may be configured to compare the current configuration data received from the identification sensors 62 to the last-known configuration data to identify differences between the new and previously stored data. In the event that differences exist in the configuration data for one or more wind turbine components, the turbine controller 26 may determine that such component(s) has been recently replaced. For example, if the name of the component manufacturer, the model number, the serial number, the date of manufacture and/or the location of manufacture provided in the newly received configuration data varies from the corresponding information provided in the previously stored configuration data, it may be inferred by the turbine controller 26 that the associated wind turbine component has been replaced.

Additionally, at (210), the method 200 may include automatically updating data associated with the wind turbine based on the identified differences between the current configuration data and the known configuration data. Specifically, as indicated above, the turbine controller 26 may be configured to implement a parameter update module 124 configured to automatically update one or more of the parameter settings applied or used when operating the wind turbine 10 based on identified differences in the configuration data of one or more of the wind turbine components. For instance, if the identified differences relate to a configuration-dependent parameter of the wind turbine 10, the parameter setting(s) associated with such parameter may be automatically updated by the turbine controller 26 to account for the change in the relevant configuration data for the component(s). In such instance, the current parameter setting(s) may be updated to a new parameter setting(s) based on the parameter setting data stored within the turbine controller's memory 112 and/or based on one or more suggested parameter settings received from the remote server 102. Similarly, as indicated above, the estimated component life and/or the maintenance schedule(s) associated with one or more of the wind turbine components may also be updated based on the identified differences between the current configuration data and the last-known configuration data.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for automatically updating data associated with a wind turbine based on component self-identification, the method comprising:
   providing, by one or more computing devices, instructions for transmitting a polling signal to an identification sensor associated with a wind turbine component;
   in response to the transmission of the polling signal, receiving, by the one or more computing devices, current configuration data for the wind turbine component from the identification sensor;
   comparing, by the one or more computing device, the current configuration data received from the identification sensor to last-known configuration data for the wind turbine component;
   automatically updating, by the one or more computing devices, one or more parameter settings associated with operating the wind turbine based on any differences identified between the current configuration data and the last-known configuration data; and
   controlling, with the one or more computing devices, an operation of the wind turbine based on the one or more parameter settings associated with operating the wind turbine that have been updated.

2. The method of claim 1, wherein the configuration data includes at least one of a model number, a serial number, a manufacturer's name, a date of manufacture, or a location of manufacture for the wind turbine component.

3. The method of claim 1, further comprising determining, by the one or more computing devices, that the wind turbine component has been replaced based on the identified differences between the current configuration data and the last-known configuration data.

4. The method of claim 1, wherein automatically updating one or more parameter settings associated with operating the wind turbine comprises automatically updating at least one parameter setting associated with a configuration-dependent parameter of the wind turbine.

5. The method of claim 1, wherein automatically updating one or more parameter settings associated with operating the wind turbine comprises:
   determining, by the one or more computing devices, at least one new parameter setting for the wind turbine corresponding to the current configuration data for the wind turbine component; and
   automatically updating, by the one or more computing devices, the one or more parameter settings to correspond to the at least one new parameter setting.

6. The method of claim 1, further comprising transmitting, by the one or more computing devices, a notification associated with the current configuration data for the wind turbine component to a remote computing device.

7. The method of claim 6, wherein automatically updating one or more parameter settings associated with operating the wind turbine comprises automatically updating the one or more parameter settings based on a suggested parameter setting received from the remote computing device.

8. The method of claim 1, further comprising automatically updating an estimated component life for the wind turbine component based on the identified differences between the current configuration data and the last-known configuration data.

9. The method of claim 1, further comprising automatically updating a maintenance schedule associated with the wind turbine component based on the identified differences between the current configuration data and the last-known configuration data.

10. The method of claim 1, wherein the wind turbine component corresponds to one of a generator, a gearbox, a rotor blade, a, yaw drive component, a pitch drive component, a wind sensor, a rotor shaft, or a bearing of the wind turbine.

11. The method of claim 1, further comprising:
providing, by the one or more computing devices, instructions for transmitting a polling signal to a plurality of identification sensors, each identification sensor being associated with one of a plurality of wind turbine components;
in response to the transmission of the polling signal, receiving, by the one or more computing devices, current configuration data from only a portion of the plurality of identification sensors; and
identifying, by the one or more computing devices, which of the plurality of identification sensors did not transmit current configuration data in response to the polling signal.

12. A method for automatically updating data associated with a wind turbine based on component self-identification, the method comprising:
providing, by one or more computing devices, instructions for transmitting a polling signal to an identification sensor associated with a wind turbine component;
in response to the transmission of the polling signal, receiving, by the one or more computing devices, current configuration data for the wind turbine component from the identification sensor;
comparing, by the one or more computing device, the current configuration data received from the identification sensor to last-known configuration data for the wind turbine component;
determining, by the one or more computing devices, that the wind turbine component has been replaced based on any differences identified between the current configuration data and the last-known configuration data;
automatically updating, by the one or more computing devices, wind turbine data associated with the wind turbine based on the determination that the wind turbine component has been replaced; and
controlling, with the one or more computing devices, an operation of the wind turbine based on one or more parameter settings associated with operating the wind turbine.

13. A system for automatically updating data associated with a wind turbine based on component self-identification, the system comprising:
a wind turbine component installed on or within the wind turbine;
an identification sensor provided in association with the wind turbine component, the identification sensor including current configuration data for the wind turbine component;
one or more computing devices including at least one processor and associated memory, the memory storing instructions that, when implemented by the at least one processor, configure the one or more computing devices to:
provide instructions for transmitting a polling signal to an identification sensor associated with a wind turbine component
in response to the transmission of the polling signal, receive current configuration data for the wind turbine component from the identification sensor;
compare the current configuration data received from the identification sensor to last-known configuration data for the wind turbine component;
automatically update one or more parameter settings associated with operating the wind turbine based on any differences identified between the current configuration data and the last-known configuration data; and
control an operation of the wind turbine based on the one or more parameter settings associated with operating the wind turbine that have been updated.

14. The system of claim 13, wherein the configuration data includes at least one of a model number, a serial number, a manufacturer's name, a date of manufacture, or a location of manufacture for the wind turbine component.

15. The system of claim 13, wherein the one or more computing devices are further configured to determine that the wind turbine component has been replaced based on the identified differences between the current configuration data and the last-known configuration data.

16. The system of claim 13, wherein the one or more computing devices are configured to update at least one parameter setting associated with a configuration-dependent parameter of the wind turbine based on the identified differences between the current configuration data and the last-known configuration data.

17. The system of claim 13, wherein the one or more computing devices are configured to:
determine at least one new parameter setting for the wind turbine corresponding to the current configuration data for the wind turbine component; and
automatically update the one or more parameter settings to correspond to the at least one new parameter setting.

18. The system of claim 13, wherein the one or more computing device are further configured to transmit a notification associated with the current configuration data for the wind turbine component to a remote computing device.

19. The system of claim 18, wherein the one or more computing devices are configured to automatically update the one or more parameter settings based on a suggested parameter setting received from the remote computing device.

20. The system of claim 13, wherein the one or more computing device are further configured to update at least one of an estimated component life for the wind turbine component or a maintenance schedule associated with the wind turbine component based on the identified differences between the current configuration data and the last-known configuration data.

* * * * *